Figure 1:
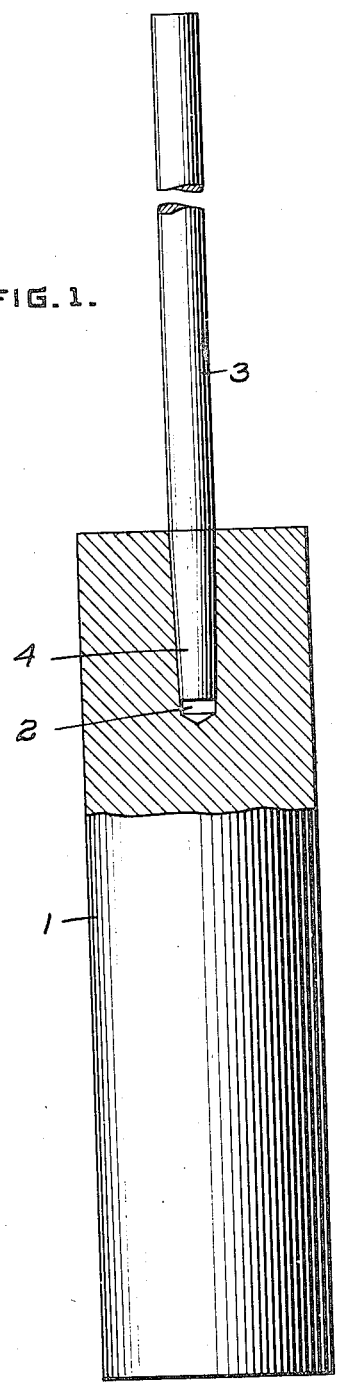

April 15, 1924.  D. M. BOOTHMAN  1,490,504

ELECTRODE

Filed May 20, 1922

INVENTOR
Dale M. Boothman,
by Winter Brown,
his attorneys.

WITNESSES
J. Herbert Bradley.

Patented Apr. 15, 1924.

1,490,504

UNITED STATES PATENT OFFICE.

DALE M. BOOTHMAN, OF PARNASSUS, PENNSYLVANIA, ASSIGNOR TO ALUMINUM COMPANY OF AMERICA, OF PITTSBURGH, PENNSYLVANIA, A CORPORATION OF PENNSYLVANIA.

ELECTRODE.

Application filed May 20, 1922. Serial No. 562,354.

*To all whom it may concern:*

Be it known that I, DALE M. BOOTHMAN, a citizen of the United States, and a resident of Parnassus, in the county of Westmoreland and State of Pennsylvania, have invented a new and useful Improvement in Electrodes, of which the following is a specification.

The invention relates to electrodes for use in electrolytic cells, and has particularly to do with those used in the electrolyzing of fused salts.

In a large plant in which fused salts are electrolyzed, for example, one in which aluminum is produced by the electrolysis of alumina in a fused cryolite bath, a great many electrodes are required because the carbon is consumed at rates as high as one pound per pound of metal produced. Each electrode usually consists of a cylindrical body of carbon attached to a metal rod through which current flows to the carbon and by which the carbon is supported in a cell in the manner explained hereinafter. Because of the large numbers of carbons continuously consumed, the problem of connecting them to the metal rod conductors and supports is one of considerable importance and magnitude. It is highly desirable that the connection be simple, that it require a minimum amount of labor to make it and that it be of a character to afford good electric conductance between the connected parts. Furthermore, it is necessary that the connection have sufficient mechanical strength to withstand considerable rough handling and to be unimpaired by the elevated temperatures incident to the use of the electrode.

In the type of electrodes usually employed in the process just explained, the body of carbon has a screw threaded connection to the end of a copper rod. A hole of suitable size is drilled in the end of the carbon, and the threaded end of the rod is then screwed into the hole, the threads on the rod cutting their way into the sides of the hole.

In practice this type of connection has been found quite objectionable and expensive for various reasons. For example, it has been found difficult in handling large numbers of electrodes to get the holes drilled exactly of the right diameter. In some instances the rods fit so tightly in the holes that they are twisted off in the operation of screwing them into the carbons, while in other cases the holes are so large that the rods are not held tightly enough to make either a good electrical or mechanical connection. Furthermore, due to the lack of continuous uniform electric contact between the rod and carbon, the threaded end of the rod frequently becomes so damaged by arcing, corrosion and the like that it may seldom be used for attaching a second carbon to it. This has made it necessary to cut off the threaded end of a rod each time it is removed from a stub of a carbon which has been used as long as possible. For these and other reasons incident to the type of connection heretofore used, there results a production of a large amount of copper scrap, arising both from the threading of the rods and from the used ends cut from them. Not only is this waste scrap in itself a matter of very considerable expense in large plants, but in addition to this there is a large labor expense involved in the threading of the rods.

The object of this invention is to provide an electrode for the purpose stated in which the connection between the body of carbon and metal rod is such as to afford good electrical conductivity and good mechanical strength, a connection which may be easily made, and one in which there is eliminated the large expense incident to the type of connection heretofore used.

Figure 2:
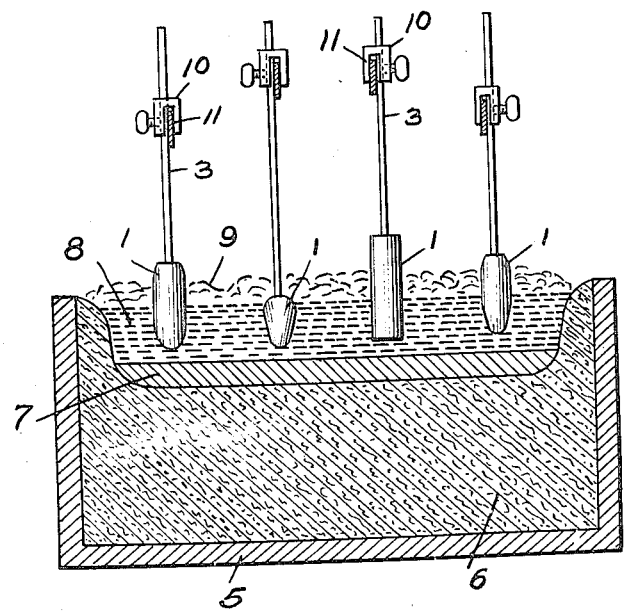

The invention is illustrated in the accompanying drawings, of which Fig. 1 is a combined elevation and central sectional view of the electrode, the connection between the body of carbon and the metal rod being the part shown in section, and Fig. 2 a transverse sectional view of a cell for the electrolysis of a fused bath showing several electrodes in operative positions.

In the practice of the invention the body of carbon 1 is provided at its end with a smooth-bore tapered hole 2, and the metal rod 3 is provided with a tapered end 4 to snugly fit the hole 2. While the invention is unlimited to the shape and size of the body of carbon and the metal rod, the carbon may, as usual, be a cylinder about fifteen inches long and four inches in diameter, and the rod may be about one-half inch in diameter. The tapered hole in the end of the carbon may be drilled in any well known or desired manner, and the taper on the end of the rod may be formed by swaging or rolling without producing any scrap. A very firm connection is effected between the carbon and rod by placing the tapered end of the rod in the hole 2 of the carbon and tapping the outer end of the carbon on a wooden block.

The manner of using the electrodes is illustrated in Fig. 2 which shows somewhat diagrammatically a cross-section of a well known type of cell for the electrolysis of a fused bath. The particular process depicted is the production of aluminum by the electrolysis of alumina in a fused cryolite bath. The cell casing 5 is provided with a carbon lining 6, above which there are indicated, in the order named, a body of aluminum 7, a fused bath of cryolite 8 and a crust 9 which forms on the top of the fused bath as the electrolysis proceeds. The electrodes are suspended in the fused bath by means of clamps 10 which attach the copper rods 3 to bus-bars 11 extending above the cell. The carbon bodies 1 of the electrodes are indicated in various states of consumption, it being understood that the electrodes are used until the carbon bodies are substantially all consumed.

When a carbon body has been consumed to the extent permitted, an attendant unclamps the copper rod from the bus-bar to which it is attached and pulls the electrodes from the fused bath through the crust 9. Frequently the crust offers so much resistance to the removal of an electrode that it is necessary for workmen to first break the crust with crow bars or other heavy tools before the electrodes may be removed. The strain which is placed upon the electrodes by thus breaking the crust, or by removing or attempting to remove them without breaking the crust, as well as by other rough handling to which they are subjected, has been found to be so effectively resisted by the mechanical strength of the taper connections between the carbon bodies and copper rods that the carbon bodies do not become detached from the rods.

It has been found by extensive actual practice of the invention that the connection is so uniform and continuous as to almost entirely eliminate arcing between the carbon and metal rod with the resulting injury to the rod. The rod may be used without alteration for six or eight carbons. The small amount of arcing and corrosion which takes place between the carbon and the rod usually makes it desirable, after the rod has been used for six or eight carbons, to clip off not more than about one-half inch of the rod and to re-taper the end to fit the tapered hole. However, this small waste is inconsiderable as compared to the large waste incident to cutting off the entire threaded ends of the rods, and there is no waste arising from rethreading the rods. The actual savings in a large electrolytic plant of the character explained has been found to amount to many thousands of dollars a year.

While the invention has been described chiefly with respect to the use of a copper rod for supporting and conducting current to the carbon body, it will be understood that rods of other metal may be used. For example, an iron rod may be used when the temperature of the molten bath is too high for copper. Furthermore, in the selection of a particular metal for the rod, consideration should be given to the possibility of contamination of the metal produced in the electrolytic process.

I claim as my invention:

1. An electrode for use in the electrolysis of a fused bath, comprising a body of carbon provided with a tapered hole, and a metal electric-conducting rod having a tapered end fitting snugly in said hole, said attachment affording an efficient electrical connection between the carbon body and metal rod and also affording a strong mechanical connection for suspending the carbon from the rod in a fused electrolytic bath.

2. An electrode for use in the electrolysis of a fused bath, comprising a body of carbon provided with a tapered hole, and a copper rod having a tapered end fitting snugly in said hole, said attachment affording an efficient electrical connection between the carbon body and copper rod, and also affording a strong mechanical connection for suspending the carbon from the rod in a fused electrolytic bath.

In testimony whereof, I sign my name.

DALE M. BOOTHMAN.

Witnesses:
 FRANCIS C. FRARY,
 JUNIUS D. EDWARDS.